(No Model.)

M. D. SLAWSON.
ANIMAL TRAP.

No. 485,303.  Patented Nov. 1, 1892.

Witnesses
Chas. A. Ford
N. W. Riley

Inventor
Marcus D. Slawson.
By his Attorneys,
C. A. Snow & Co.

THE NORRIS PETERS CO., PHOTO-LITHO., WASHINGTON, D. C.

UNITED STATES PATENT OFFICE.

MARCUS D. SLAWSON, OF GRAYLING, MICHIGAN.

ANIMAL-TRAP.

SPECIFICATION forming part of Letters Patent No. 485,303, dated November 1, 1892.

Application filed June 30, 1892. Serial No. 438,614. (No model.)

*To all whom it may concern:*

Be it known that I, MARCUS D. SLAWSON, a citizen of the United States, residing at Grayling, in the county of Crawford and State of Michigan, have invented a new and useful Game-Trap, of which the following is a specification.

The invention relates to improvements in animal-traps.

The object of the present invention is to provide a trap for large animals—such as the bear or the like—which will be adapted to securely hold and quickly kill an animal, and which will prevent an animal when caught from pounding it to pieces and escaping.

The invention consists in the construction and novel combination and arrangement of parts hereinafter fully described, illustrated in the accompanying drawings, and pointed out in the claims hereto appended.

Figure 1:
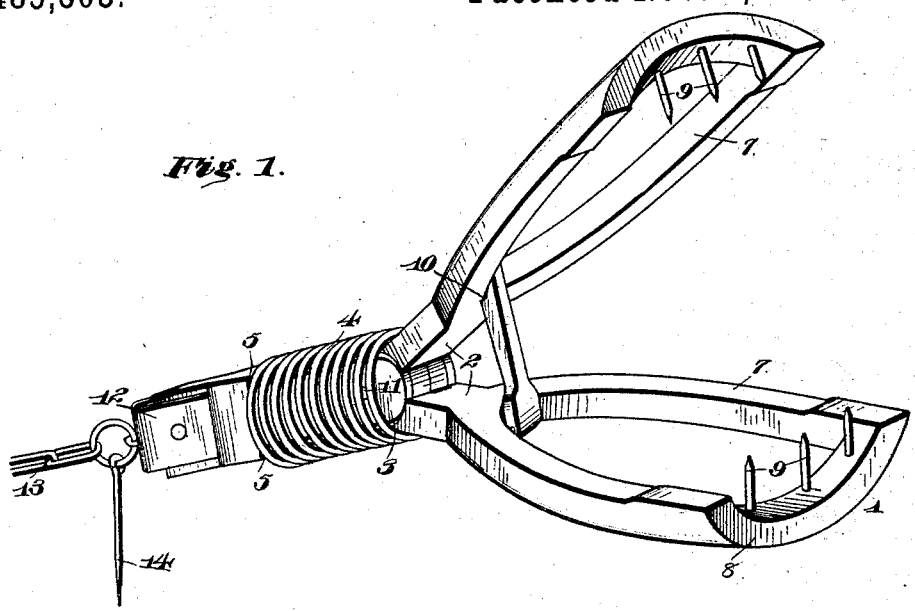
Figure 2:
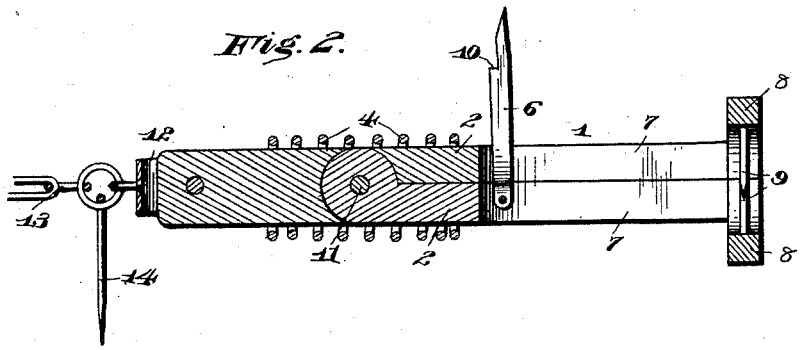

In the drawings, Figure 1 is a perspective view of a trap constructed in accordance with this invention and shown set. Fig. 2 is a longitudinal sectional view, the trap being sprung.

Like numerals of reference indicate corresponding parts in both the figures of the drawings.

1 1 designate jaws, provided at the inner ends with extensions 2 and pivoted in a bifurcation of a shank 3 and adapted to be closed to spring the trap by a spiral spring 4, which is disposed on the shank 3, and which has one end bearing against shoulders 5 and its other end engaging the jaws at the extensions 2. The jaws, which are held separated by a trigger 6, each consist of curved diverging sides 7 and a transversely-curved end bar 8, which is provided with vertical pins or points 9, which form teeth and are adapted to enter the neck of an animal caught to cause death to ensue quickly. The end bar 8 of the upper jaw is curved upward or arched and the end bar of the lower jaw depends and curves downward, and both jaws form an elliptical ring when the jaws are closed to prevent an animal freeing itself from the trap by any sidewise movement. The curved diverging sides form open spaces to clear the head of an animal to cause the jaws to close tightly in a vise-like grasp on the neck of the animal caught, and an animal caught will be impaled on the points or teeth, and any movement on the part of the animal in attempting to free itself will hasten its death. The trigger 6 is pivoted to one of the jaws in the crotch formed by the sides and is provided with a shoulder 10, adapted to be engaged by the other jaw to hold the jaws separated. An animal in attempting to get the bait will pull the shoulder out of engagement with the upper jaw and spring the trap. The extensions of the jaws are reduced to form ears, which are perforated and are secured in the bifurcation of the shank by a pivot 11.

It will be readily seen that the trap is especially adapted for large animals—such as the bear—that its particular shape will enable it to be readily placed within a hollow log or to be otherwise concealed, and that it is quickly sprung, and will cause death to ensue quickly and will prevent an animal breaking it and becoming free. The trap is also adapted for small animals, and it is constructed of malleable iron or other suitable material.

The shank is provided at its rear end with a metal strap or stirrup 12, to which is connected a chain 13, and it is provided at the inner end of the chain with a pin 14, which may be readily driven into a tree to support the trap at an elevation, so as to cause the head of an animal to enter the jaws in attempting to get the bait.

What I claim is—

1. In a trap, the combination of a shank, the similar jaws each pivoted to the shank and having diverging sides, a curved end bar connecting the sides, and vertical points extending inward from the end bar, a trigger pivoted at one end to one of the jaws in the crotch formed by the diverging sides and provided at its other end with a shoulder adapted to engage the other jaw to hold the jaws separated, and a spiral spring disposed on the shank and engaging the jaws and adapted to close the same, substantially as described.

2. A trap comprising a shank, jaws pivoted to the shank and having diverging sides and curved ends provided with points, a trigger pivoted to one of the jaws and adapted to engage the other jaw to set the trap, a spiral spring disposed on the shank and engaging the jaws, a chain attached to the shank, and a pin connected to the chain, substantially as described.

In testimony that I claim the foregoing as my own I have hereto affixed my signature in the presence of two witnesses.

MARCUS D. SLAWSON.

Witnesses:
J. E. BROCKWAY,
GEO. L. ALEXANDER.